(12) United States Patent
Sato

(10) Patent No.: US 9,143,262 B2
(45) Date of Patent: Sep. 22, 2015

(54) OPTICAL PACKET TRANSMITTING/RECEIVING SYSTEM

(75) Inventor: Reiko Sato, Kawasaki (JP)

(73) Assignee: FUJITSU TELECOM NETWORKS LIMITED, Kawasaki-Shi (JP)

( * ) Notice: Subject to any disclaimer, the term of this patent is extended or adjusted under 35 U.S.C. 154(b) by 411 days.

(21) Appl. No.: 13/413,505

(22) Filed: Mar. 6, 2012

(65) Prior Publication Data
US 2012/0243869 A1   Sep. 27, 2012

(30) Foreign Application Priority Data

Mar. 25, 2011   (JP) ................ 2011-067611

(51) Int. Cl.
H04J 14/02   (2006.01)
H04J 14/08   (2006.01)
H04Q 11/00   (2006.01)

(52) U.S. Cl.
CPC ......... *H04J 14/0212* (2013.01); *H04J 14/0267* (2013.01); *H04Q 11/0005* (2013.01); *H04J 14/0227* (2013.01); *H04Q 11/0066* (2013.01); *H04Q 2011/005* (2013.01); *H04Q 2011/0039* (2013.01)

(58) Field of Classification Search
CPC ............ H04J 14/0267; H04L 12/5689; H04Q 2011/0039; H04Q 11/0066
USPC .................... 398/45, 48, 49, 50, 51
See application file for complete search history.

(56) References Cited

U.S. PATENT DOCUMENTS

| | | | |
|---|---|---|---|
| 6,894,970 B1 * | 5/2005 | McDermott et al. .......... 370/220 |
| 8,073,327 B2 * | 12/2011 | Mayer et al. .................... 398/54 |
| 8,284,680 B2 * | 10/2012 | Lee et al. ....................... 370/242 |
| 2003/0031198 A1 * | 2/2003 | Currivan et al. .............. 370/465 |
| 2003/0123349 A1 * | 7/2003 | Otomo et al. ............... 369/47.16 |
| 2005/0083921 A1 * | 4/2005 | McDermott et al. .......... 370/360 |
| 2006/0146871 A1 * | 7/2006 | Ryu et al. ....................... 370/466 |
| 2007/0091862 A1 * | 4/2007 | Ioannidis ....................... 370/338 |

(Continued)

FOREIGN PATENT DOCUMENTS

JP   2004-120148 A   4/2004
JP   2004120148 A   *   4/2004

(Continued)

OTHER PUBLICATIONS

Nagai English Translation.*

(Continued)

*Primary Examiner* — Oommen Jacob
(74) *Attorney, Agent, or Firm* — Christie, Parker & Hale, LLP

(57) ABSTRACT

An optical packet transmitting/receiving system includes an optical packet transmitting apparatus for generating a copied optical packet signal of an original packet signal to be transmitted and for transmitting the copied optical packet signal after the original optical packet signal, an optical packet receiving apparatus for performing an error recovery processing based on the copied optical packet signal of the original optical packet signal, when an error occurs with the received original optical packet signal, and an optical packet switching apparatus. When congestion occurs between a copied optical packet signal inputted to an input port and an original optical packet signal inputted to another input port, the optical packet switching apparatus preferentially passes the original optical packet signal.

6 Claims, 6 Drawing Sheets

(56) References Cited

U.S. PATENT DOCUMENTS

| | | | |
|---|---|---|---|
| 2007/0097937 A1* | 5/2007 | Kubota et al. | 370/338 |
| 2009/0313465 A1* | 12/2009 | Verma et al. | 713/153 |
| 2010/0226243 A1* | 9/2010 | Lee et al. | 370/216 |
| 2012/0243869 A1* | 9/2012 | Sato | 398/49 |

FOREIGN PATENT DOCUMENTS

| | | |
|---|---|---|
| JP | 2004-228754 | 8/2004 |
| JP | 2008-235986 | 10/2008 |
| JP | 2009-055212 | 3/2009 |

OTHER PUBLICATIONS

Japanese Office action with English Machine Translation for Patent Application No. 2011-067611 issued on Feb. 3, 2014, 6 pages.

Office action mailed by the Japanese Patent Office for JP app. No. 2011-067611 on Jun. 24, 2014, with English translation (5 pages).

* cited by examiner

OPTICAL PACKET TRANSMITTING/RECEIVING SYSTEM

CROSS-REFERENCE TO RELATED APPLICATION

This application claims priority to and the benefit of Japanese Patent Application Number 2011-067611, filed on Mar. 25, 2011, the entire disclosure of which is incorporated herein by reference.

BACKGROUND OF THE INVENTION

1. Field of the Invention

The present invention relates to an optical packet transmitting/receiving system that enables packet switching for each optical packet.

2. Description of the Related Art

In optical transmission systems employing wavelength division multiplexing (WDM), a technique that performs the path switching per wavelength by the use of a wavelength selective switch (WSS) and the like is put to practical use. As a technology that may succeed this technique, an optical packet switching method is now being investigated. In this optical packet switching method, an IP packet (10 GEther (10 Gigabit Ethernet (registered trademark) signal and the like), for example, is used as a small unit with which the switching is performed, and each is converted into the form of an optical packet and then the route is switched by an ultrahigh-speed optical packet switch (see Reference (1) in the following Related Art List, for instance).

The IP packet does not transfer any significant information in the absence of data therein, so that the bandwidth corresponding thereto is wasted. However, if the optical packet switching system is realized, then the time slot of a packet where data is absent can be occupied by another packet. Therefore, the optical packet switching system is considered a promising technology of the future which is capable of markedly enhancing the bandwidth usage efficiency of the transmission path.

RELATED ART LIST (1) Japanese Unexamined Patent Application Publication No. 2008-235986.

In the optical packet switching system, an optical packet signal where an error occurs is discarded when the error occurs in the received optical packet signal due to, for instance, a waveform deterioration in an optical transmission path. Thus, it is desired that the optical packet discarding rate be reduced and thereby the transmission quality be improved.

SUMMARY OF THE INVENTION

The present invention has been made in view of the foregoing circumstances, and a purpose is to provide a technology for reducing the optical packet discarding rate.

In order to resolve the above-described problems, an optical packet transmitting/receiving system includes: an optical packet transmitting apparatus configured to generate a copied optical packet signal of an original optical packet signal to be transmitted and configured to transmit the copied optical packet signal after an original optical packet signal; and an optical packet receiving apparatus configured to perform an error recovery processing based on the copied optical packet signal of the original optical packet signal, when an error occurs with the received original optical packet signal.

The optical packet transmitting apparatus may add a packet ID to the original optical packet signal, the packet ID being used to distinguish the original optical packet signal from another original optical packet signal, and the optical packet transmitting apparatus may add a copy flag to the copied optical packet signal generated, the copy flag indicating that the copied optical packet signal is a copy of the original optical signal.

The optical packet receiving apparatus may identify a copied optical packet signal of an original optical packet signal where the error occurs, based on the packet ID and the copy flag of the received optical packet signal.

When the original optical packet signal is normally received or when the error recovery processing is performed based on the copied optical packet signal, the optical packet receiving apparatus may keep the packet ID thereof, and when an optical packet signal having the same packet ID is received thereafter, the optical packet receiving apparatus may discard said optical packet signal.

The optical packet transmitting apparatus may generate a predetermined number of copied optical packet signals after an original optical packet signal to be copied.

The optical packet transmitting apparatus may generate as many copied optical packet signals as practicable between an original packet signal to be copied and the subsequent original optical packet signal.

When a copied optical packet is received earlier than an original optical packet signal to be copied and when said original optical packet signal is received within a predetermined time after the receipt of said copied optical packet, the optical packet receiving apparatus may perform a predetermined processing on said original optical packet signal.

When a copied optical packet is received earlier than an original optical packet signal to be copied and when said original optical packet signal is not received within a predetermined time after the receipt of said copied optical packet, the optical packet receiving apparatus may perform a predetermined processing on said copied optical packet signal.

When a copied optical packet is received earlier than an original optical packet signal to be copied and when said original optical packet signal is not received within a predetermined time after the receipt of said copied optical packet, the optical packet receiving apparatus may discard said copied optical packet signal.

The optical packet transmitting/receiving system may further include an optical packet switching apparatus configured to switch a route of optical packet signal inputted and configured to output the optical packet signal, the optical packet switching apparatus being provided between the optical packet transmitting apparatus and the optical packet receiving apparatus, and when congestion occurs between a copied optical packet signal inputted to an input port and an original optical packet signal inputted to another input port, the optical packet switching apparatus may preferentially pass the original optical packet signal.

When congestion occurs between a copied optical packet signal inputted to the input port and a copied optical packet signal inputted to the another input port, the optical packet switching apparatus may preferentially pass the copied optical packet signal having a longer packet length.

When congestion occurs between a copied optical packet signal inputted to the input port and a copied optical packet signal inputted to the another input port, the optical packet switching apparatus may preferentially pass the copied optical packet signal having a packet length greater than or equal to a predetermined value.

Optional combinations of the aforementioned constituting elements, and implementations of the invention in the form of apparatuses, methods, systems, programs, recording media storing the programs and so forth may also be practiced as additional modes of the present invention.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which.

DETAILED DESCRIPTION OF THE INVENTION

The invention will now be described by reference to the preferred embodiments. This does not intend to limit the scope of the present invention, but to exemplify the invention.

A description will be given hereunder of an embodiment of the present invention with reference to the drawings.

Figure 1:
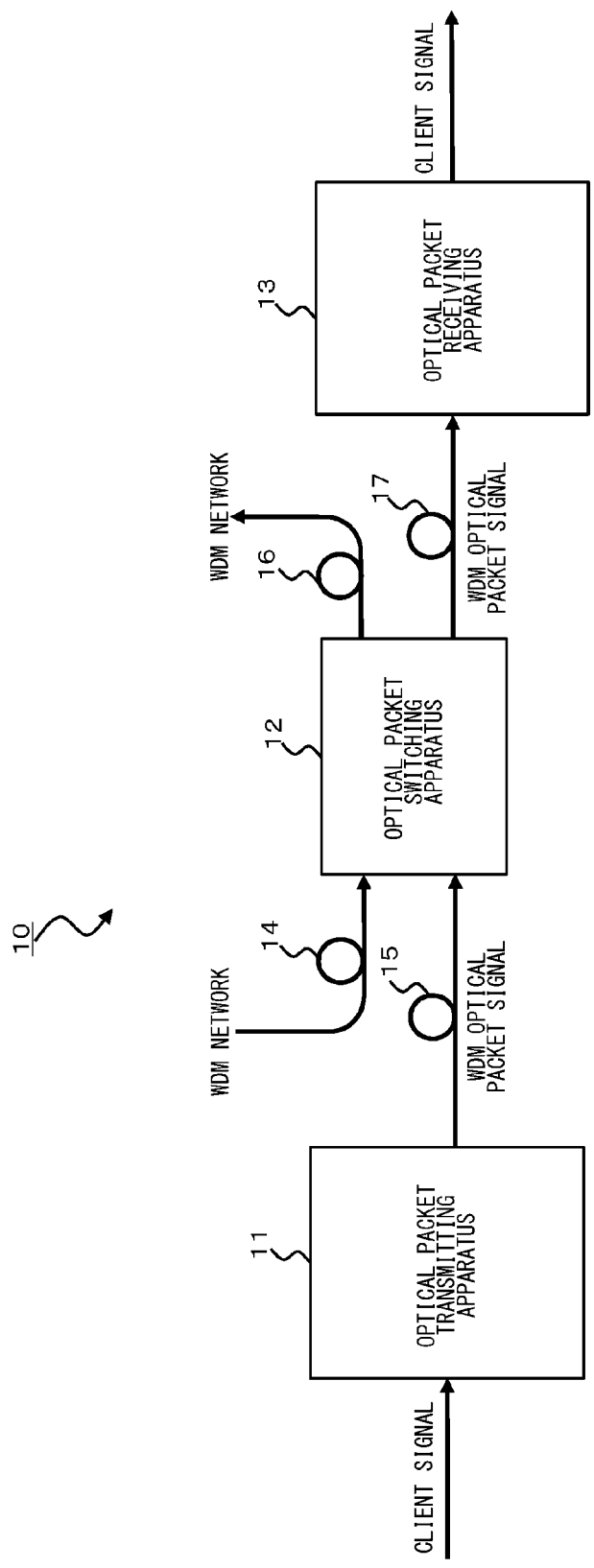
FIG. 1 illustrates an optical packet transmitting/receiving apparatus according to an embodiment of the present invention.

FIG. 1 shows an optical packet switching system according to an embodiment of the present invention. As shown in FIG. 1, an optical packet transmitting/receiving system 10 includes an optical packet transmitting apparatus 11, an optical packet switching apparatus 12 with two inputs and two outputs, an optical packet receiving apparatus 13, first to fourth optical transmission paths 14 to 17.

The optical packet transmitting apparatus 11 splits a client signal received from a client side into ten signals. (Here, the client signal is 10 GEther (10 Gigabit Ethernet (registered trademark) packet signal), for example. Then the thus split ten data are loaded on optical signals of wavelengths λ1 to λ10 so as to generate optical packet signals of ten wavelengths. Then the optical packet signals of wavelength λ1 to λ10 are wavelength-multiplexed and outputted as WDM optical packet signals. Note that the division number of the client signal and the number of wavelengths are both ten but they may be set to an arbitrary number.

A WDM optical packet signal outputted from the optical packet transmitting apparatus 11 is inputted to a second input unit of the optical packet switching apparatus 12 via the second optical transmission path 15. Also, another WDM optical packet signal is inputted to a first input unit of the optical packet switching apparatus 12 via the first optical transmission path 14.

The optical packet switching apparatus 12 extracts routing information from the inputted WDM optical packet signal and switches the route of the WDM optical packet signal according to the routing information extracted. The third optical transmission path 16 is connected to a first output unit of the optical packet switching apparatus 12, whereas the fourth optical transmission path 17 is connected to a second output unit thereof. The WDM optical packet signal that has propagated through the fourth optical transmission path 17 is inputted to the optical packet receiving apparatus 13.

The optical packet receiving apparatus 13 branches the received WDM optical packet signal into optical packet signals of wavelengths λ1 to λ10, then restores the original client signal and outputs the restored signal to the client side.

Figure 2:
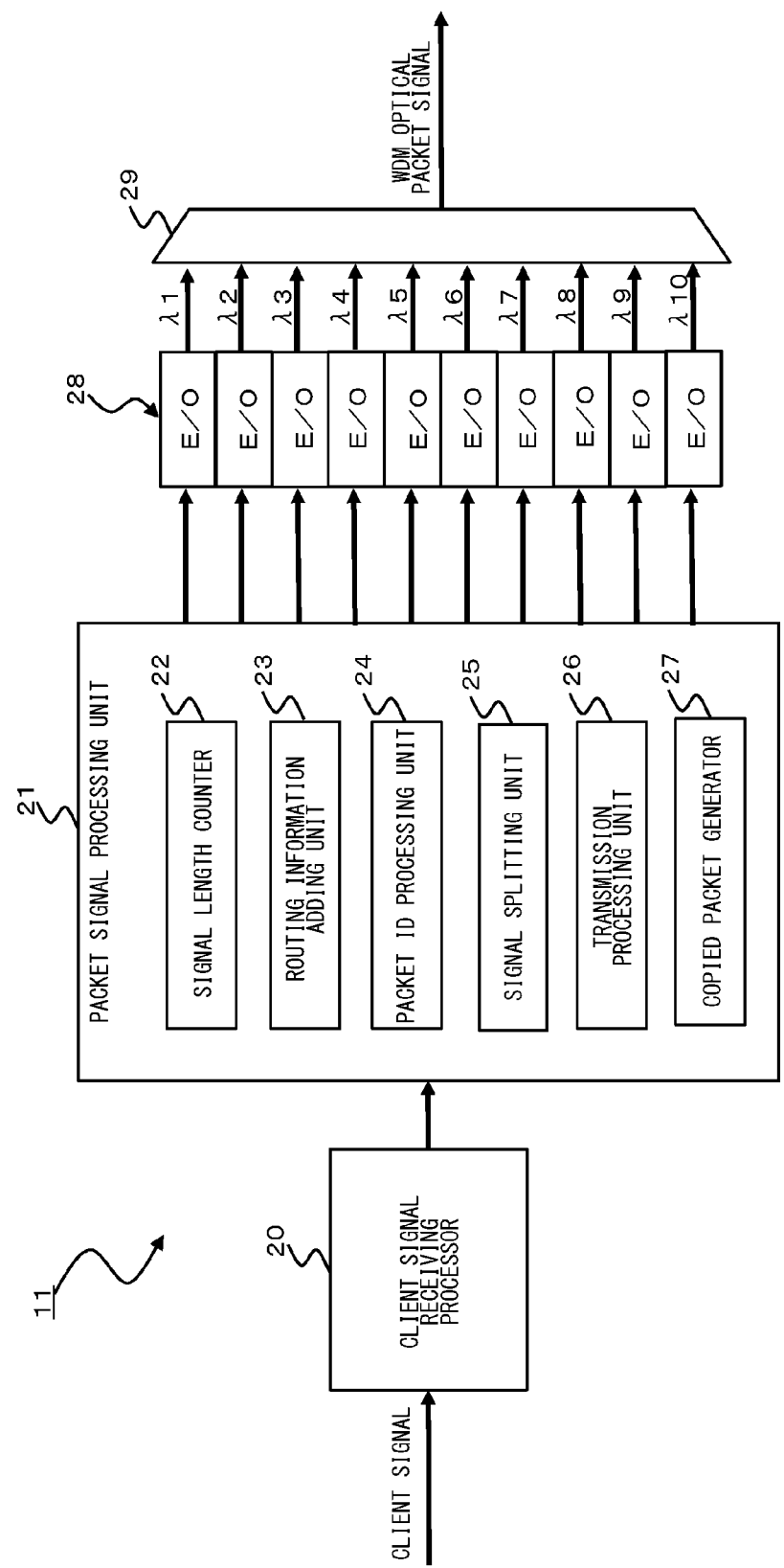
FIG. 2 illustrates an optical packet transmitting apparatus according to an embodiment.

FIG. 2 illustrates the optical packet transmitting apparatus 11 according to the present embodiment. As shown in FIG. 2, the optical packet transmitting apparatus 11 includes a client signal receiving processor 20, a packet signal processing unit 21, an electrical-to-optical (E/O) converter 28, and an AWG (arrayed waveguide grating) 29.

The client signal receiving processor 20 performs such predetermined processings as optical-to-electrical conversion, reshaping (equalization and amplification) and regeneration (identification and regeneration) on the received client signal and then outputs the processed signal to the packet signal processing unit 21. Also, the client signal receiving processor 20 buffers the received client signals.

The packet signal processing unit 21 includes a signal length counter 22, a routing information adding unit 23, a packet ID processing unit 24, a signal splitting unit 25, a transmission processing unit 26, and a copied packet generator 27.

The signal length counter 22 counts the length of the received client signal. Also, the signal length counter 22 counts the intervals between the client signals. The routing information adding unit 23 extracts the routing information from the client signal and adds the routing information to the client signal as a header. The packet ID processing unit 24 adds an packet ID to the header. The packet ID is used to distinguish the optical packet signals sent from the optical packet transmitting apparatus 11, from each other.

The signal splitting unit 25 splits the client signal to which the header has been attached, into ten signals, based on the packet signal length information. The transmission processing unit 26 adds a preamble to the beginning of each of the split signals and carries out other processings so as to generate a packet signal suitable for a predetermined packet switching system. Hereinbelow, a packet signal generated from such a client signal will be referred to as "original packet signal" as appropriate. The copied packet generator 27 will be discussed later.

The ten original packet signals generated by the transmission processing unit 26 are inputted to the electrical-to-optical (E/O) converter 28. The electrical-to-optical (E/O) converter 28 is constituted by ten E/O modules. The electrical-to-optical (E/O) converter 28 converts the ten original packet signals, outputted from the packet signal processing unit 21, into "original optical packet signals" of wavelengths λ1 to λ10. Of the optical packet signals of wavelengths λ1 to λ10, the wavelength of an optical packet signal having the header is called "header wavelength". Assume herein that the header wavelength is λ1.

The original optical packet signals of wavelengths λ1 to λ10 outputted from the E/O converter 28 are inputted to the AWG 29. The AWG 29 wavelength-multiplexes the original optical packet signals of wavelengths λ1 to λ10 and outputs them as "original WDM packet signals".

A description is now given of the copied packet generator 27 of the packet signal processing unit 21. The copied packet generator 27 generates a copy of the original packet signal generated by the transmission processing unit 26. Also, the packet signal processing unit 21 adds a "copy flag" to the header of the copy. The copy flag is used to distinguish an original packet signal from its copy and vice versa. The copy of such an original packet signal will be hereinbelow referred to as a "copied packet signal" as appropriate.

Similar to the original packet signals, the ten copied optical packet signals generated by the copied packet generator 27 are sent to the E/O converter 28 where they are converted into "copied optical packet signals" of wavelengths λ1 to λ10. The copied optical packets of wavelengths λ1 to λ10 outputted from the E/O converter 28 are inputted to the AWG 29 and are outputted as "copied WDM optical packet signals".

Figure 3:
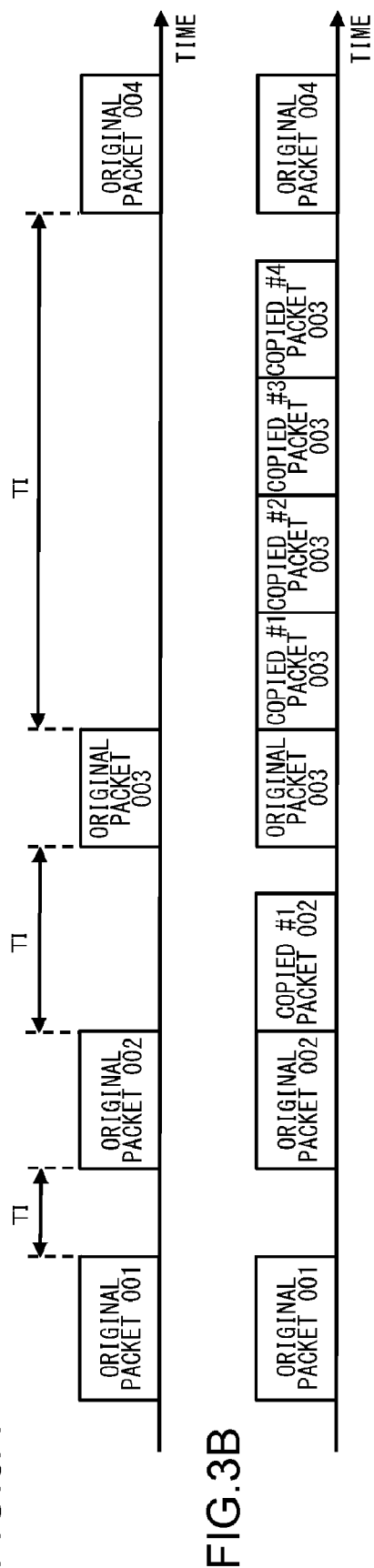
FIGS. 3A and 3B are diagrams by which to explain the generation of copied packet signals.

FIGS. 3A and 3B are diagrams by which to explain the generation of copied packet signals. In FIGS. 3A and 3B, the horizontal axis represents time. A description is now given herein of a process in which a copied packet associated with a wavelength is generated. It is to be understood by the skilled in the art that the similar processes are carried out for all the rest of the wavelengths.

FIG. 3A illustrates a state before the generation of copied packet signals. Assume that original packets 001 to 004 are sequentially generated by the transmission processing unit 26 with the timings as shown in FIG. 3A. There is a time interval TI (referred to as "original packet signal interval TI") between the adjacent original packets. The original packet signal interval TI varies depending on the interval between the client signals inputted to the optical packet transmitting apparatus 11 and the length of client signal.

FIG. 3B illustrates a state after the generation of copied packet signals. In the present embodiment, the copied packet generator 27 generates as many copied packet signals as practicable between the original packet signal to be copied and the subsequent original packet signal.

As described above, the signal length counter 22 not only counts the signal length of the client signal but also counts the intervals between the client signals. In order not to cause the overflow of client signals in the client signal receiving processor 20, it is required that the sum of the client signal length and the client signal interval equals the sum of the original optical packet signal length and the original packet signal interval TI. Based on this relation, the copied packet generator 27 can calculate the original packet signal interval TI. Then the copied packet generator 27 calculates the number of copied packet signals that can be inserted between the original packet signals, based on the thus calculated original packet signal interval TI and the copied packet signal length (which is almost equal to the original packet signal length). The copied packet generator 27 generates the calculated number of copied packet signals and inserts those copied packet signals after the original packet signal to be copied.

More specifically explaining in conjunction with the example of FIGS. 3A and 3B, the copy of the original packet 001 is not inserted between the original packet 001 and the original packet 002 because of a short original packet signal interval TI. Also, one copied packet 002 of the original packet 002 is inserted between the original packet 002 and the original packet 003. Also, four copied packet 003 of the original packet 003 are inserted between the original packet 003 and the original packet 004. As shown in FIG. 3B, each copied packet signal has the same packet ID (e.g., 001 or 002) as the original packet to be copied, and a copy flag (e.g., #1 or #2) indicating that it is a copy is added to each copied packet signal.

An electrical packet signal sequence of the original optical packet signals and their copied packet signals as shown in FIGS. 3B are subjected to the electrical-to-optical conversion by the E/O converter 28, and then an optical packet signal sequence of the original optical packet signals and their copied packet signals are outputted.

Employed in the foregoing description is a method for calculating the original packet signal interval TI between original packet signals before the copying of the original packet signal. However, there are also other methods for generating copied packet signals. For example, the copied packet generator 27 may determine whether any copied packet signal can be generated or not, by detecting the interval between the copied packet signal and the subsequent original packet signal every time a single copied packet signal is generated.

Also, employed in the foregoing description is a method by which as many copied packet signals as practicable are generated between the original packet signal to be copied and the subsequent original packet signal. However, the arrangement may be such that the copied packet generator 27 generates a predetermined number of copied packet signals and inserts them between the original packet signals. When a predetermined number of copied packet signals cannot be inserted because of a short interval between the original packet signals, the predetermined number of copied packet signals can be inserted by delaying the generation of the subsequent original packet signal. Such processing can be performed because the buffering of the client signal is done at the client signal receiving processor 20. Also, the arrangement may be such that a maximum number of copied packet signals that can be inserted are inserted when a predetermined number of copied packet signals cannot be inserted because of a short interval between the original packet signals.

Also, the copied packet generator 27 may monitor the remaining capacity of a buffering memory and change the number of copied packet signals to be generated. For example, if there is extra remaining capacity within the buffering memory, the interval TI between original packet signals may be widened by delaying the subsequent original packet signal and more copied packet signals may be inserted. On the other hand, if there is little extra remaining capacity within the buffering memory, the delaying of the subsequent original packet signal may be either nullified or at least reduced so as to generate a minimum necessary number (e.g., one) of copied packet signals. Theoretically, use of the buffering memory of a larger capacity may proportionately increase the number of copied packet signals that can be inserted. From the viewpoint of cost, however, there may be a limit to the capacity of the buffering memory to be used. The above-mentioned arrangement, therefore, may achieve cost reduction and improvement of transmission quality in a balanced manner.

Figure 4:
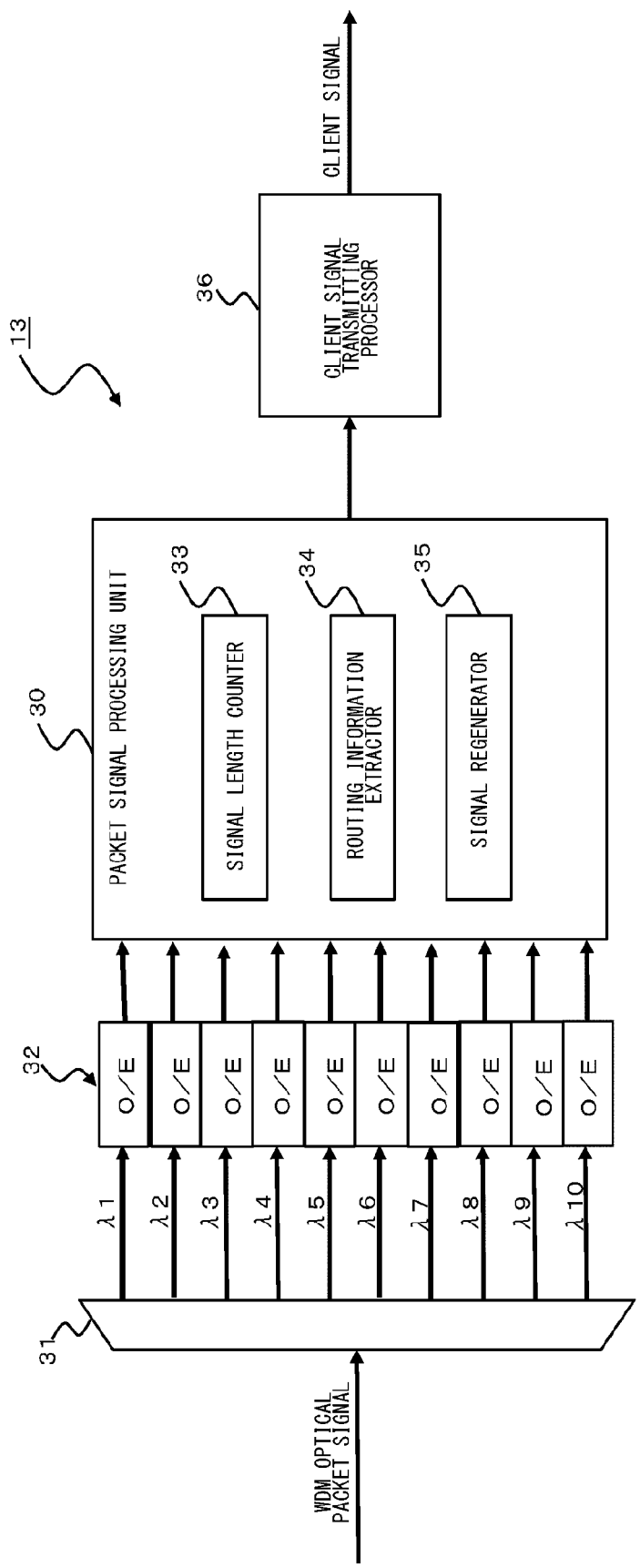
FIG. 4 illustrates a structure of an optical packet receiving apparatus according to an embodiment.

FIG. 4 shows a structure of the optical packet receiving apparatus 13 according to the present embodiment. As shown in FIG. 4, the optical packet receiving apparatus 13 includes an AWG 31, an optical-to-electrical (O/E) converter 32, a packet signal processing unit 30, and a client signal transmitting processor 36.

The AWG 31 branches an inputted WDM optical packet signal into optical packet signals of wavelengths λ1 to λ10. As already mentioned, the optical signals of the respective wavelengths are each a sequence of original optical packet signals and their copied optical packet signals. The optical packet signals of ten wavelengths branched by the AWG 31 are inputted to the optical-to-electrical (O/E) converter 32.

The optical-to-electrical (O/E) converter 32 is comprised of ten O/E modules. The O/E converter 32 converts the optical packet signals of ten wavelengths from the AWG 31 into their respective electrical packet signals. The packet signals thus converted are inputted to the packet signal processing unit 30.

The packet signal processing unit 30 includes a signal length counter 33, a routing information extractor 34, and a signal regenerator 35.

The signal length counter 33 counts the signal length of each packet signal. The routing information extractor 34 extracts routing information from the packet signal corresponding to the header wavelength. The signal regenerator 35 determines the normality of the packet signal based on the packet signal length information and the routing information. Normally, an original optical packet signal having been transmitted earlier arrives at the optical packet receiving apparatus 13 earlier than the copied optical packet signals of the same packet ID, so that the signal regenerator 35 first determines the normality of the original packet signal. And, if the signal regenerator 35 determines that the original packet signal is normal, the signal regenerator 35 regenerates the client signal by assembling the packets.

On the other hand, when a client signal cannot be regenerated because of an error occurring with an original packet signal, the signal regenerator 35 waits for a copied packet signal of the original packet signal having the error for a predetermined time 1.

With the optical packet transmitting/receiving system 10 as illustrated in FIG. 1, a copied optical packet signal does not necessarily arrive at the optical packet receiving apparatus 13 immediately after the arrival of the original optical packet signal simply because the optical packet transmitting apparatus 11 has transmitted the copied optical packet signal immediately after the original optical packet signal. For example, there may be a case where another optical packet signal is inserted between the original optical packet signal and the copied optical packet signal by the optical packet switching apparatus 12. Therefore, the signal regenerator 35 needs to identify the copied packet signal of the original packet signal having an error from among the packet signals having arrived. This copied packet signal can be identified based on the packet ID and the copy flag. In other words, if there is a packet signal having the same ID as that of the original packet signal having the error and a copy flag attached thereto, then the packet signal can be identified as the copied packet signal.

Now if the copied packet signal arrives within the time 1, the signal regenerator 35 determines the normality of the copied packet signal and, if the copied packet signal is found normal, regenerates the client signal based on the copied packet signal. However, when the client signal cannot be regenerated because of an error occurring with the copied packet signal, the signal regenerator 35 again waits for a copied packet signal for the time 1.

On the other hand, if the copied packet signal does not arrive within the time 1, the signal regenerator 35 discards its original packet signal and, for instance, requests the optical packet transmitting apparatus, which is the source, for retransmission. It should be noted that the time 1, during which the copied packet signal is waited for, may be set as appropriate based on the transmission timing of the copied packet signal by the optical packet transmitting apparatus 11 and the transmission time of the copied packet signal.

The client signal regenerated normally by the signal regenerator 35 is sent to the client signal transmitting processor 36. The client signal transmitting processor 36 adds transfer information for the client (e.g., an IP address for an IP network) and then converts the signal into an optical signal before outputting the converted signal to the client.

When a client signal has been regenerated based on an original packet signal or a copied optical packet signal, the signal regenerator 35 keeps the packet ID of the packet signal in memory for a certain period of time. Then if any packet signal having the same packet ID arrives, the packet signal is discarded. Thus, any duplicated transmission of the client signal can be prevented.

Figure 5:
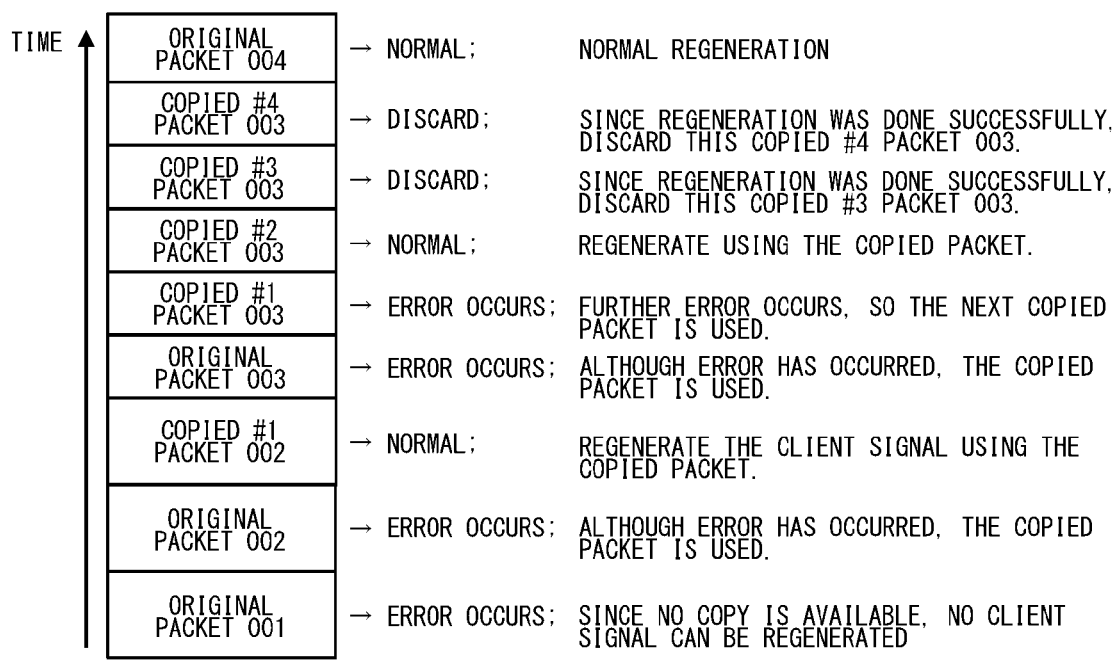
FIG. 5 is a diagram by which to explain an error recovery processing according to an embodiment.

FIG. 5 is a diagram by which to explain an error recovery processing according to the present embodiment. In FIG. 5, the vertical axis represents time. An original packet 001 is the packet signal having arrived first, whereas an original packet 004 is the packet signal having arrived last. The packet signals shown in FIG. 5 correspond to the packet signals shown in FIG. 3B.

As shown in FIG. 5, if an error has occurred with the original packet 001, there is no copied packet signal, so that the signal regenerator 35 cannot regenerate a client signal.

However, if the copied packet 002 is normal even when there is an error with the original packet 002, the signal regenerator 35 can regenerate the client signal using the copied packet 002.

When errors have occurred with both the original packet 003 and a first copied packet 003, the signal regenerator 35 can regenerate the client signal using a second copied packet 003 provided this second copied packet 003 is normal. In this case, the signal regenerator 35 discards the subsequent third and fourth copied packets 003 since the signal regenerator 35 has succeeded in regenerating the client signal.

If the original packet 004 is normal, the signal regenerator 35 can regenerate the client signal using the original packet 004.

In this manner, according to the present embodiment, even when a client signal cannot be regenerated because of an error occurring with an original packet signal, the client signal can be regenerated based on the copied packet signal. This will lower the packet discarding rate, thus raising the signal quality.

In an Ethernet network or the like, when an error occurs with a received packet signal, a request is sent to the transmission source for retransmission. And this requires time for the recovery from the error. According to the present embodiment, however, even when an error occurs with an original packet signal, the error recovery can be accomplished instantly by the use of a subsequent copied packet signal. The method in this embodiment is therefore an error recovery method utilizing the bandwidth effectively since the copied packet signals are sent during the primarily free interval between original packet signals.

As described earlier, an original packet signal normally arrives before the copied packet signal, but there are cases where the copied packet signal arrives earlier than the original packet signal. Such cases are especially evident with multicast packets. A processing performed in such cases is described below.

When a copied packet signal has arrived before the original packet signal, the signal regenerator 35 waits for the original packet signal for a predetermined time 2. The early arrival of the copied packet signal can be determined based on whether an original packet signal having the same packet ID has already arrived or not.

If the original packet signal arrives within the time 2, the signal regenerator 35 determines the normality of the original packet signal and, if the original packet signal is found normal, regenerates the client signal based on the original packet signal. In this manner, when the delay is short, the client signal is regenerated using the original packet signal preferentially. If there is an error with the original packet signal, the signal regenerator 35 determines the normality of the copied packet signal which the signal regenerator 35 had received earlier and, if the copied packet signal is found normal, regenerates the client signal based on the copied packet signal. If an error is found with the copied packet signal, then the packet signal is discarded.

On the other hand, if the original packet signal does not arrive within the time 2, the signal regenerator 35 determines the normality of the copied packet signal which the signal regenerator 35 has already received and, if the copied packet is found normal, regenerates the client signal based on the copied packet signal. If an error is found with the copied packet signal, too, then the packet signal is discarded. Alternatively, if the original packet signal does not arrive within the time 2, the signal regenerator 35 may discard the copied packet signal which the signal regenerator 35 has already received.

Figure 6:
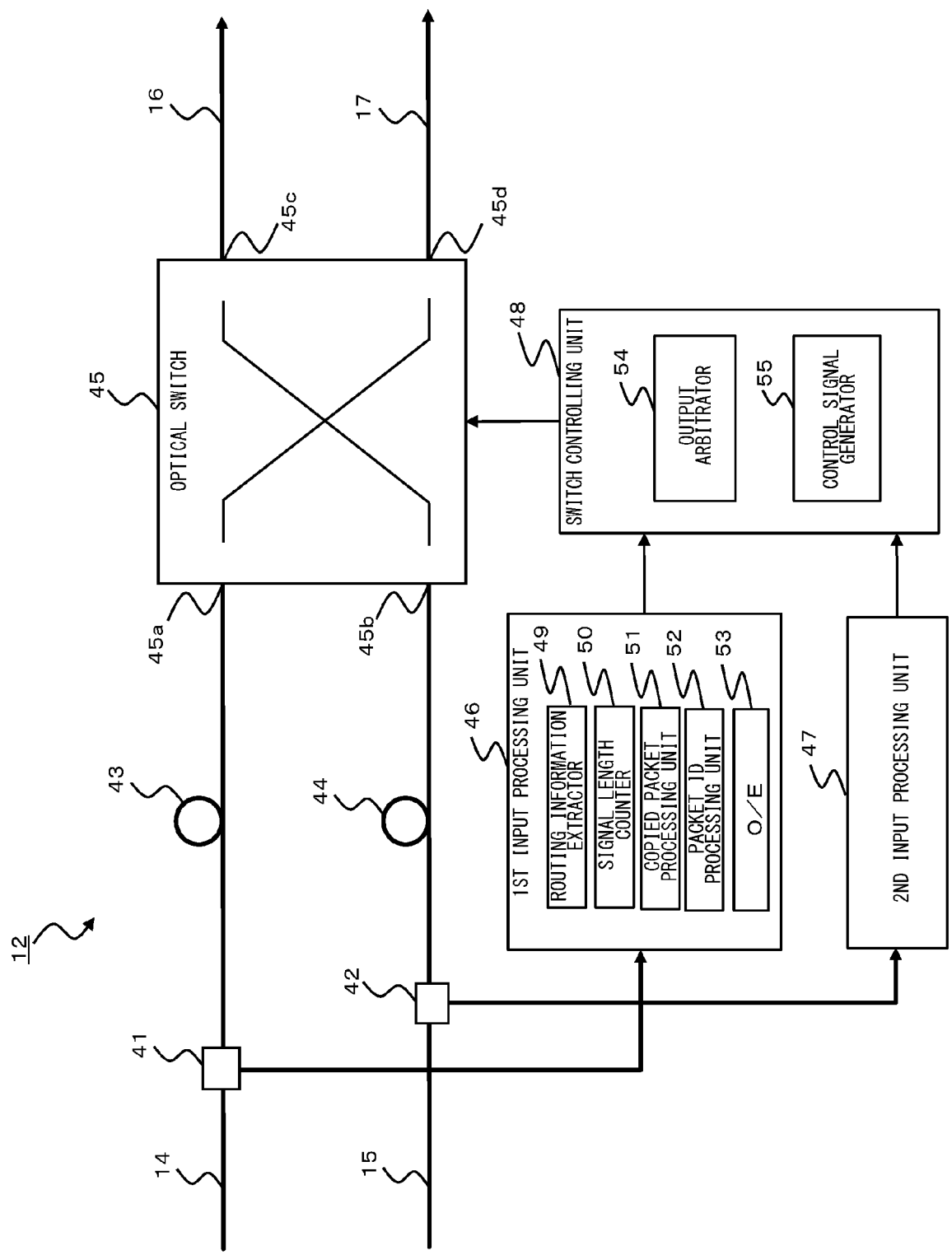
FIG. 6 illustrates an optical packet switching apparatus according to an embodiment.

FIG. 6 illustrates the optical packet switching apparatus 12 according to the present embodiment. The optical packet switching apparatus 12 includes an optical switch 45, a first input processing unit 46, a second input processing unit 47, a switch controlling unit 48, a first optical coupler 41, a second optical coupler 42, a first optical delay line 43, and a second optical delay line 44.

A WDM optical packet signal (hereinafter referred to as "first WDM optical packet signal") which has arrived at the optical packet switching apparatus 12 via a first optical transmission path 14 from a WDM network is inputted to the first optical coupler 41. The first optical coupler 41 branches an optical packet signal of header wavelength λ1 only from the first WDM optical packet signal and outputs the branched signal to the first input processing unit 46. The first WDM optical packet signal having passed through the first optical coupler 41 is inputted to a first input port 45a of the optical switch 45 via the first optical delay line 43.

Also, a WDM optical packet signal (hereinafter referred to as "second WDM optical packet signal") which has arrived at the optical packet switching apparatus 12 via a second optical transmission path 15 from the optical packet transmitting apparatus 11 is inputted to the second optical coupler 42. The second optical coupler 42 branches an optical packet signal of header wavelength λ1 only from the second WDM optical packet signal and outputs the branched signal to the second input processing unit 47. The second WDM optical packet signal having passed through the second optical coupler 42 is inputted to a second input port 45b of the optical switch 45 via the second optical delay line 44.

The first input processing unit 46 includes a routing information extractor 49, a signal length counter 50, a copied packet processing unit 51, a packet ID processing unit 52, and an optical-to-electrical (O/E) converter 53.

The O/E converter 53 converts the optical packet signal of header wavelength λ1 received from the first optical coupler 41 into an electrical signal. The routing information extractor 49 extracts routing information by analyzing the header of the electrical packet signal. The signal length counter 50 counts the signal length of the packet signal. The copied packet processing unit 51 determines whether there is a copy flag or not, by analyzing the header of the packet signal and thereby determines the type of packet signal, that is, whether the packet signal is an original optical packet signal or a copied packet signal. The packet ID processing unit 52 extracts packet ID information by analyzing the header of the packet signal. Information on routing, signal length, type of packet signal, and packet ID detected by the first input processing unit 46 is sent to the switch controlling unit 48.

The structure of the second input processing unit 47 is the same as that of the first input processing unit 46. The second input processing unit 47 detects the routing information, signal length information, packet signal type information, and packet ID information from the optical packet signal of header wavelength λ1 received from the second optical coupler 42 and sends them to the switch controlling unit 48.

The switch controlling unit 48 includes an output arbitrator 54 and a control signal generator 55.

When congestion does not occur between a first WDM optical packet signal and a second WDM optical packet signal, the control signal generator 55 generates an optical switch control signal as required by the first input processing unit 46 or the second input processing unit 47 and outputs the optical switch control signal to the optical switch 45.

On the other hand, when congestion occurs between a first WDM optical packet signal and a second WDM optical packet signal, the control signal generator 55 performs an arbitration between the WDM optical packet signals based on the respective pieces of information inputted from the first input processing unit 46 and the second input processing unit 47. In other words, the output arbitrator 54 determines which of the first WDM optical packet signal and the second WDM optical packet signal is to be passed through.

As a rule, when congestion occur between two WDM optical packet signals, the output arbitrator 54 passes the WDM optical packet signal having arrived first and discards the WDM optical packet signal having arrived next. However, if this rule is observed for the arbitration in the present embodiment, there may arise a situation where an original optical packet signal congested with the copied optical packet signal is discarded. To avoid such a situation, the output arbitrator 54 makes a determination as described below.

1. When congestion occurs between original optical packet signals, the original optical packet signal having arrived first is passed preferentially.

2. When congestion occurs between an original optical packet signal and a copied optical packet signal, the original optical packet signal is passed preferentially. That is, if an original optical packet signal arrives when a copied optical packet signal having arrived first is being outputted, the outputting of the copied optical packet signal is discontinued and the original optical packet signal is passed instead.

The determination process like this helps avoid the situation in which an original optical packet signal is discarded because of the presence of a copied optical packet signal.

Also, there are cases where congestion occurs between copied optical packet signals. In such cases, there may be, for example, a method for preferentially passing the copied optical packet signal having arrived first or a method in which flags indicating the order of priority are added to the header of copied optical packet signals and a copied optical packet signal having a higher order of priority is passed preferentially.

In addition to these, when congestion occurs between copied optical packet signals, a copied optical packet signal having a longer packet length may be passed preferentially, for example. Or a copied optical packet signal having a packet length which is greater than or equal to a predetermined value may be passed preferentially. This is because longer packets are liable to cause bit errors and therefore this method is more advantageous for error recovery if a copied optical packet signal having a longer packet length is passed preferentially.

Also, when congestion occurs between copied optical packet signals, the arrangement may be such that both the copied optical packet signals are discarded to widen the bandwidth when their packet lengths are both less than a predetermined threshold value and that the copied optical packet signal having arrived first is passed preferentially when they are not less than the threshold value.

Also, when congestion occurs between copied optical packet signals, a copied optical packet signal which is equal to the copy of an original optical packet signal having passed immediately before the original packet may be passed. Also, in a case where congestion occurs between original optical packet signals at the last minute and one of the original optical packet signals has been discarded, a copied optical packet signal which is equal to the copy of the discarded original optical packet signal may be passed.

The present invention has been described based upon illustrative embodiments. The above-described embodiments are intended to be illustrative only and it will be obvious to those skilled in the art that various modifications to the combination of constituting elements and processes could be developed and that such modifications are also within the scope of the present invention.

What is claimed is:

1. An optical packet transmitting/receiving system, comprising:
    an optical packet transmitting apparatus configured to generate a copied optical packet signal of an original optical packet signal to be transmitted and configured to transmit the copied optical packet signal after the original optical packet signal; and
    an optical packet receiving apparatus configured to perform an error recovery processing based on the copied optical packet signal of the original optical packet signal, when an error occurs with a received original optical packet signal,
    wherein the optical packet transmitting apparatus is configured to add a packet ID to the original optical packet signal, the packet ID being used to distinguish the original optical packet signal from another original optical packet signal,
    wherein the optical packet transmitting apparatus is configured to add a copy flag to the copied optical packet signal generated, the copy flag indicating that the copied optical packet signal is a copy of the original optical signal, and
    wherein the optical packet transmitting apparatus is configured to calculate a number of copied optical packet signals to generate between the original packet signal and a subsequent original optical packet signal based on an interval length between the original packet signal and the copied optical packet signal, and generate the number of calculated copied optical packet signals.

2. The optical packet transmitting/receiving system according to claim 1, wherein the optical packet receiving apparatus is configured to identify the copied optical packet signal of the original optical packet signal where the error occurs, based on the packet ID and the copy flag of a received copied optical packet signal.

3. The optical packet transmitting/receiving system according to claim 1, wherein, when the original optical packet signal is normally received or when the error recovery processing is performed based on the copied optical packet signal, the optical packet receiving apparatus is configured to keep the packet ID thereof, and
    when an optical packet signal having the same packet ID is received thereafter, the optical packet receiving apparatus is configured to discard said optical packet signal having the same packet ID.

4. An optical packet transmitting/receiving system, comprising:
    an optical packet transmitting apparatus configured to generate a copied optical packet signal of an original optical packet signal to be transmitted and configured to transmit the copied optical packet signal after the original optical packet signal; and
    an optical packet receiving apparatus configured to perform an error recovery processing based on the copied optical packet signal of the original optical packet signal, when an error occurs with a received original optical packet signal,
    wherein, when the copied optical packet is received earlier than the original optical packet signal to be copied and when said original optical packet signal is received within a predetermined time after receipt of said copied optical packet, the optical packet receiving apparatus is configured to perform a predetermined processing on said original optical packet signal.

5. The optical packet transmitting/receiving system according to claim 4, wherein, when the copied optical packet is received earlier than the original optical packet signal to be copied and when said original optical packet signal is not received within a predetermined time after receipt of said copied optical packet, the optical packet receiving apparatus is configured to perform a predetermined processing on said copied optical packet signal.

6. The optical packet transmitting/receiving system according to claim 4, wherein, when the copied optical packet is received earlier than the original optical packet signal to be copied and when said original optical packet signal is not received within a predetermined time after receipt of said copied optical packet, the optical packet receiving apparatus is configured to discard said copied optical packet signal.

* * * * *